US 11,394,960 B2

(12) United States Patent
Robert et al.

(10) Patent No.: US 11,394,960 B2
(45) Date of Patent: Jul. 19, 2022

(54) VIRTUAL TEMPORAL AFFINE CANDIDATES

(71) Applicant: INTERDIGITAL VC HOLDINGS, INC., Wilmington, DE (US)

(72) Inventors: Antoine Robert, Mezieres sur Couesnon (FR); Franck Galpin, Thorigne-Fouillard (FR); Tangi Poirier, Thorigne-Fouillard (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 0 days.

(21) Appl. No.: 17/253,680

(22) PCT Filed: Jun. 14, 2019

(86) PCT No.: PCT/US2019/037150
§ 371 (c)(1),
(2) Date: Dec. 18, 2020

(87) PCT Pub. No.: WO2020/005572
PCT Pub. Date: Jan. 2, 2020

(65) Prior Publication Data
US 2021/0211650 A1    Jul. 8, 2021

(30) Foreign Application Priority Data

Jun. 29, 2018  (EP) ..................................... 18305832
Aug. 3, 2018   (EP) ..................................... 18306062

(51) Int. Cl.
*H04N 19/105*    (2014.01)
*H04N 19/137*    (2014.01)
(Continued)

(52) U.S. Cl.
CPC ......... *H04N 19/105* (2014.11); *H04N 19/137* (2014.11); *H04N 19/176* (2014.11); *H04N 19/30* (2014.11)

(58) Field of Classification Search
None
See application file for complete search history.

(56) References Cited

U.S. PATENT DOCUMENTS

| 2018/0098063 A1 | 4/2018 | Chen et al. |
| 2018/0192069 A1 | 7/2018 | Chen et al. |
| 2020/0244989 A1* | 7/2020 | Lee ...................... H04N 19/137 |

FOREIGN PATENT DOCUMENTS

| WO | WO2017148345 | 9/2017 |
| WO | WO2017156705 | 9/2017 |
| WO | WO2018126163 | 7/2018 |

OTHER PUBLICATIONS

Chen, Description of SDR, HDR and 360° Video Coding Technology Proposal by Qualcomm and Technicolor—Low and High Complexity Versions, Joint Video Exploration Team (JVET) of ITU-T SG 16 WP 3 and ISO/IEC JTC 1/SC 29/WG 11, 10th Meeting: San Diego, US, Apr. 10-20, 2018, Document JVET-J0021.
(Continued)

*Primary Examiner* — Christopher G Findley
(74) *Attorney, Agent, or Firm* — Ronald Kolczynski

(57) ABSTRACT

A video encoder or decoder processes portions of video using virtual temporal affine motion candidates. Under the general aspects, virtual temporal affine candidates are created using only the classical temporal motion buffer information, avoiding the storage of additional affine parameters in a temporal motion buffer. A motion field for encoding or decoding a video block is generated based on the virtual temporal affine candidates. In one embodiment, collocated motion candidates are rescaled by adjusting the picture order count of the determined motion field. In another embodi-
(Continued)

ment, resolution adaptation is performed to enable a current motion buffer to correspond to a reference motion buffer.

20 Claims, 25 Drawing Sheets

(51) Int. Cl.
*H04N 19/176* (2014.01)
*H04N 19/30* (2014.01)

(56) References Cited

OTHER PUBLICATIONS

Galpin, et al., Non CE4: Virtual Temporal Affine, Joint Video Experts Team (JVET) of ITU-T SG 16 WP 3 and ISO/IEC JTC 1/SC 29/WG 11 11th Meeting: Ljubljana, SI, Jul. 10-18, 2018, Document: JVET-K0267-rl.

* cited by examiner

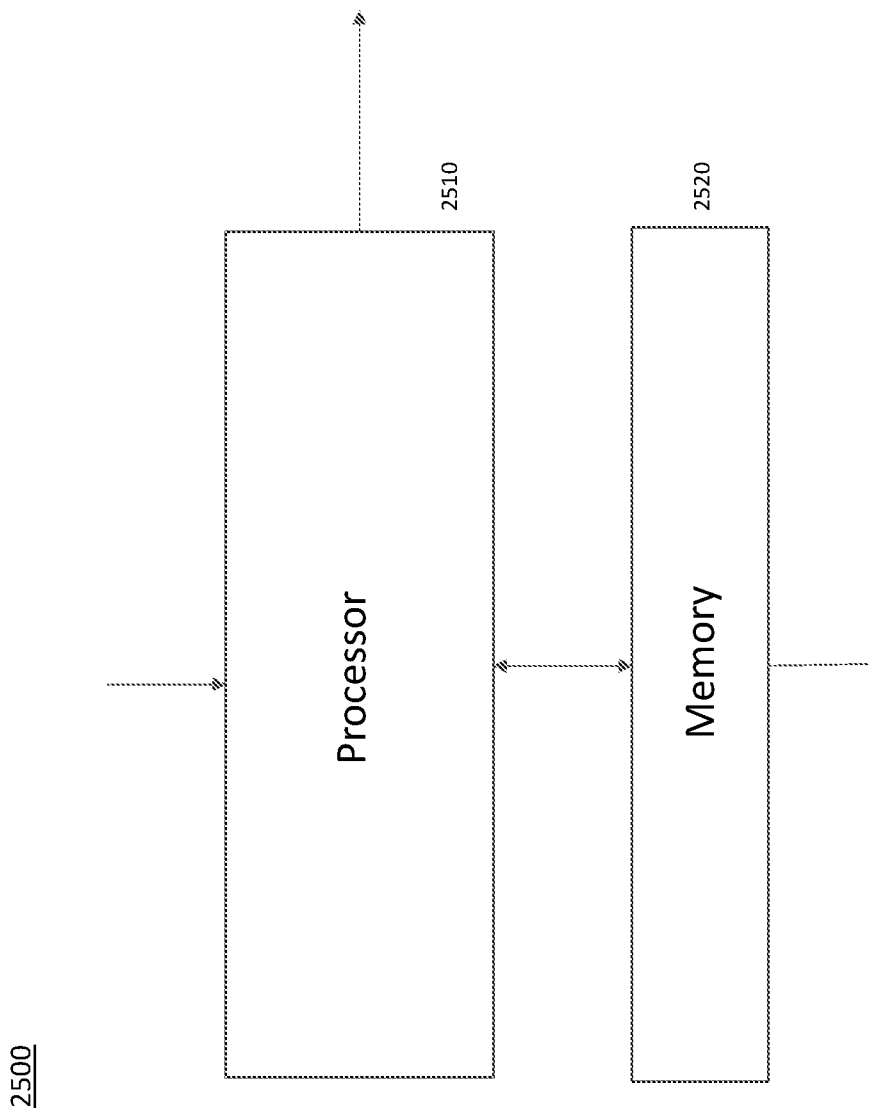

VIRTUAL TEMPORAL AFFINE CANDIDATES

TECHNICAL FIELD

At least one of the present embodiments generally relates to a method or an apparatus for video encoding or decoding, and more particularly, to a method or an apparatus for selecting a predictor candidate from a set of predictor candidates for motion compensation based on a motion model such as, e.g., an affine model, for a video encoder or a video decoder.

BACKGROUND

To achieve high compression efficiency, image and video coding schemes usually employ prediction, including motion vector prediction, and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transform, and prediction.

A recent addition to high compression technology includes using a motion model based on affine modeling. In particular, affine modeling is used for motion compensation for encoding and decoding of video pictures. In general, affine modeling is a model using at least two parameters such as, e.g., two control point motion vectors (CPMVs) representing the motion at the respective corners of a block of picture, that allows deriving a motion field for the whole block of a picture to simulate, e.g., rotation and homothety (zoom).

SUMMARY

The drawbacks and disadvantages of the prior art are addressed by the general aspects described herein, which are directed to block shape adaptive intra prediction directions in encoding and decoding.

According to a first aspect, there is provided a method. The method comprises steps for determining, for a video block being encoded in a picture, at least one predictor candidate; determining for the at least one predictor candidate, one or more corresponding control point motion vectors, based on motion information associated to the at least one predictor candidate; determining for the video block being encoded, one or more corresponding control point motion vectors, based on neighboring sub-blocks surrounding corner sub-blocks of the video block, wherein said neighboring sub-blocks surrounding corner sub-blocks are searched in an order to determine a first neighboring sub-block having a motion vector and using that as a predictor candidate for the corresponding corner; determining, based on the one or more corresponding control point motion vectors determined for the video block, a corresponding motion field, wherein the corresponding motion field identifies motion vectors used for prediction of sub-blocks of the video block being encoded; and, encoding the video block based on the corresponding motion field.

According to another aspect, there is provided a second method. The method comprises steps for determining, for a video block being decoded in a picture, at least one predictor candidate; determining for the at least one predictor candidate, one or more corresponding control point motion vectors, based on motion information associated to the at least one predictor candidate; determining for the video block being decoded, one or more corresponding control point motion vectors, based on neighboring sub-blocks surrounding corner sub-blocks of the video block, wherein said neighboring sub-blocks surrounding corner sub-blocks are searched in an order to determine a first neighboring sub-block having a motion vector and using that as a predictor candidate for the corresponding corner; determining, based on the one or more corresponding control point motion vectors determined for the video block, a corresponding motion field, wherein the corresponding motion field identifies motion vectors used for prediction of sub-blocks of the video block being decoded; and, decoding the video block based on the corresponding motion field.

According to another aspect, there is provided an apparatus. The apparatus comprises a processor. The processor can be configured to encode a block of a video or decode a bitstream by executing either of the aforementioned methods.

According to another general aspect of at least one embodiment, there is provided a device comprising an apparatus according to any of the decoding embodiments; and at least one of (i) an antenna configured to receive a signal, the signal including the video block, (ii) a band limiter configured to limit the received signal to a band of frequencies that includes the video block, or (iii) a display configured to display an output representative of the video block.

According to another general aspect of at least one embodiment, there is provided a non-transitory computer readable medium containing data content generated according to any of the described encoding embodiments or variants.

According to another general aspect of at least one embodiment, there is provided a signal comprising video data generated according to any of the described encoding embodiments or variants.

According to another general aspect of at least one embodiment, a bitstream is formatted to include data content generated according to any of the described encoding embodiments or variants.

According to another general aspect of at least one embodiment, there is provided a computer program product comprising instructions which, when the program is executed by a computer, cause the computer to carry out any of the described decoding embodiments or variants.

These and other aspects, features and advantages of the general aspects will become apparent from the following detailed description of exemplary embodiments, which is to be read in connection with the accompanying drawings.

BRIEF DESCRIPTION OF THE DRAWINGS

FIG. 25 shows one embodiment of an apparatus for encoding or decoding a video block using virtual temporal affine candidates.

DETAILED DESCRIPTION

The general aspects described here are in the field of video compression. These aspects aim at improving compression efficiency compared to existing video compression systems.

In the HEVC video compression standard (H.265/HEVC High Efficiency Video Coding, ITU-T H.265 Telecommunication Standardization Sector of ITU, "Series H: Audiovisual and Multimedia Systems, Infrastructure of audiovisual services Coding of moving video, High efficiency video coding."), motion compensated temporal prediction is employed to exploit the redundancy that exists between successive pictures of a video.

Figure 1:
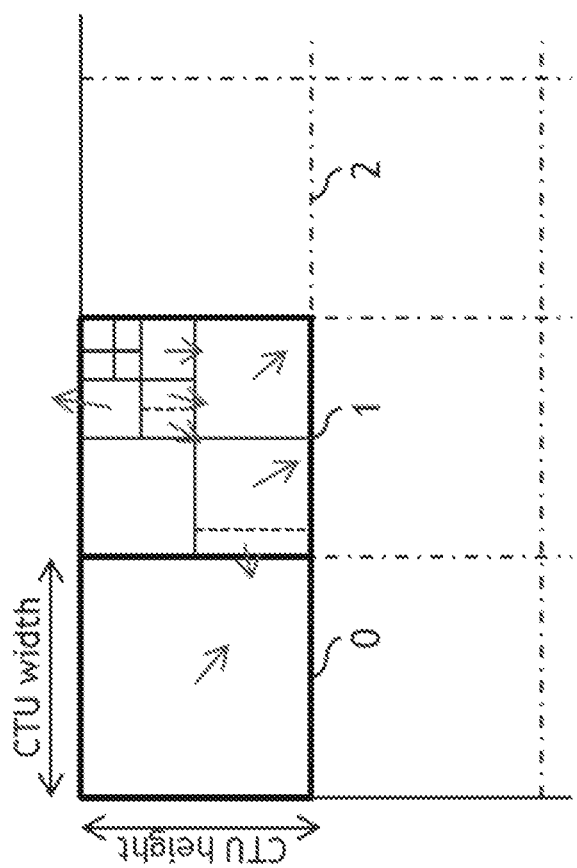
FIG. 1 shows a Coding Tree Unit and Coding Tree concepts to represent a compressed HEVC picture.

To do so, a motion vector is associated to each prediction unit (PU), which is introduced now. Each CTU (Coding Tree Unit) is represented by a Coding Tree in the compressed domain. This is a quad-tree division of the CTU, where each leaf is called a Coding Unit (CU), see FIG. 1.

Figure 2:
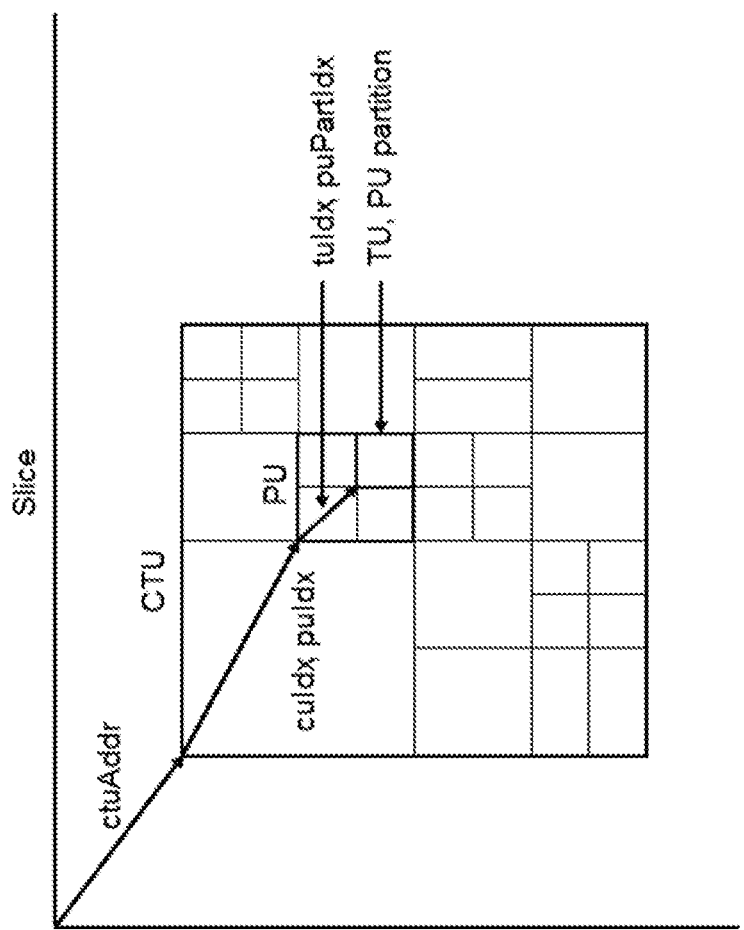
FIG. 2 shows division of a Coding Tree Unit into Coding Units, Prediction Units and Transform Units.

Each CU is then given some Intra or Inter prediction parameters (Prediction Info). To do so, it is spatially partitioned into one or more Prediction Units (PUs), each PU being assigned some prediction information. The Intra or Inter coding mode is assigned on the CU level, see FIG. 2.

Exactly one Motion Vector is assigned to each PU in HEVC. This motion vector is used for motion compensated temporal prediction of the considered PU. Therefore, in HEVC, the motion model that links a predicted block and its reference block simply consists in a translation.

In the Joint Exploration Model (JEM) and later VTM (Versatile Video Coding (VVC) Test Model) developed by the JVET (Joint Video Exploration Team) group, some richer motion models are supported to improve temporal prediction. To do so, a PU can be spatially divided into sub-PU and a richer model can be used to assign each sub-PU a dedicated motion vector.

A CU is no longer divided into PU or TU, and some motion data is directly assigned to each CU. In this new codec design, a CU can be divided into sub-CU and a motion vector can be computed for each sub-CU.

One of the new motion models introduced in the JEM is the affine model, which basically consists in using an affine model to represent the motion vectors in a CU.

Figure 3:
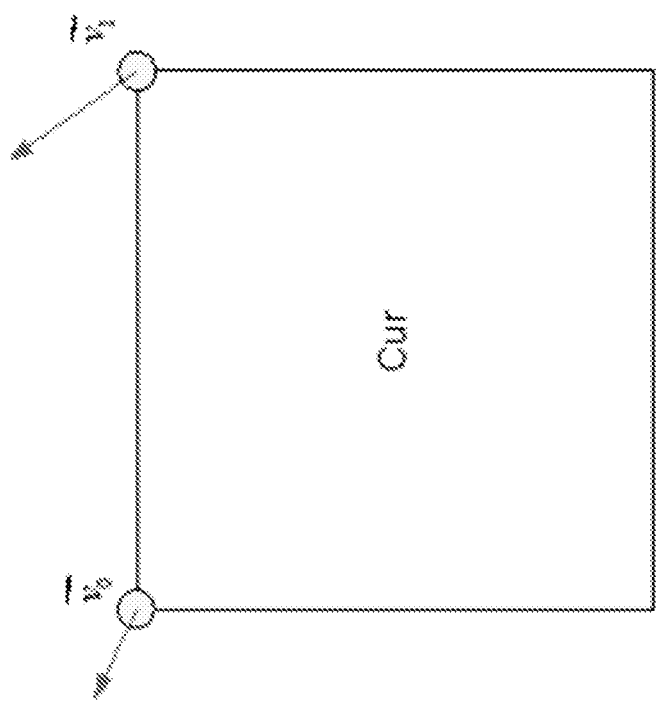
FIG. 3 shows a simple affine model used in the Joint Exploration Model.

The motion model used is illustrated by FIG. 3. The affine motion field consists in the following motion vector component values for each position (x,y) inside the considered block:

Equation 1: affine model used to generate the motion field inside a CU to predict $$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases}$$

Coordinates $(v_{0x}, v_{0y})$ and $(v_{1x}, v_{1y})$ are the so-called control point motion vectors used to generate the affine motion field. The point $(v_{0x}, v_{0y})$ is the motion vector top-left corner control point and $(v_{1x}, v_{1y})$ is the motion vector top-right corner control point.

Figure 4:
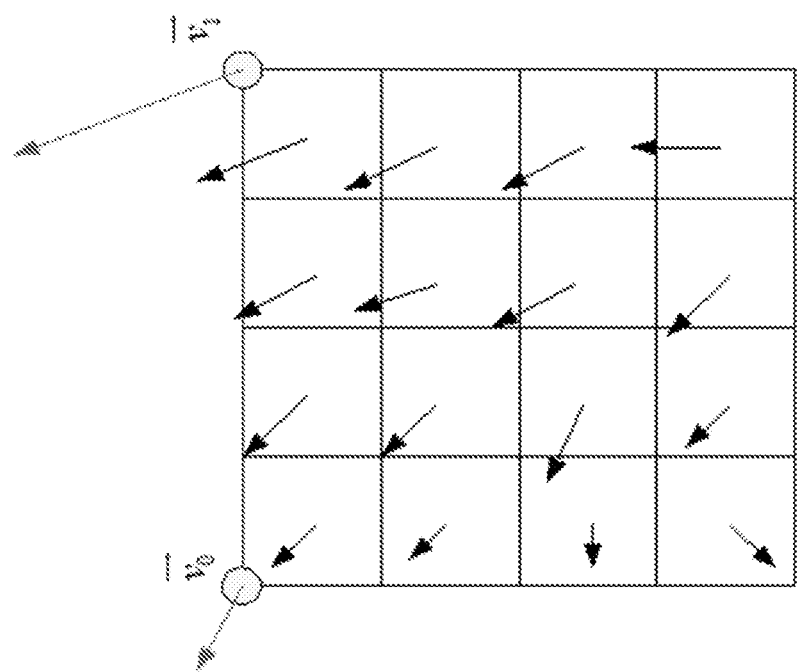
FIG. 4 shows a 4×4 sub-CU based affine motion vector field.

In practice, to keep complexity reasonable, a motion vector is computed for each 4×4 sub-block (sub-CU) of the considered CU, as illustrated on FIG. 4. An affine motion vector is computed from the control point motion vectors, at the position of the center of each sub-block. The obtained MV is represented at 1/16 pixel accuracy.

As a result, the temporal coding of a coding unit in the affine mode consists in motion compensated predicting each sub-block with its own motion vector.

Note that a model with three control points is also possible.

Affine motion compensation can be used in three ways in the JEM: Affine Inter (AF_INTER), Affine Merge and Affine Template. They are introduced in the following:

Affine Inter (AF_INTER).

Figure 5:
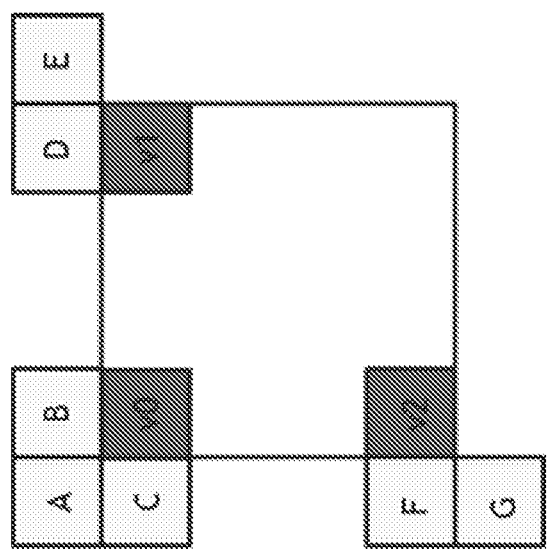
FIG. 5 shows the Motion vector prediction process for Affine Inter CUs.
Figure 6:
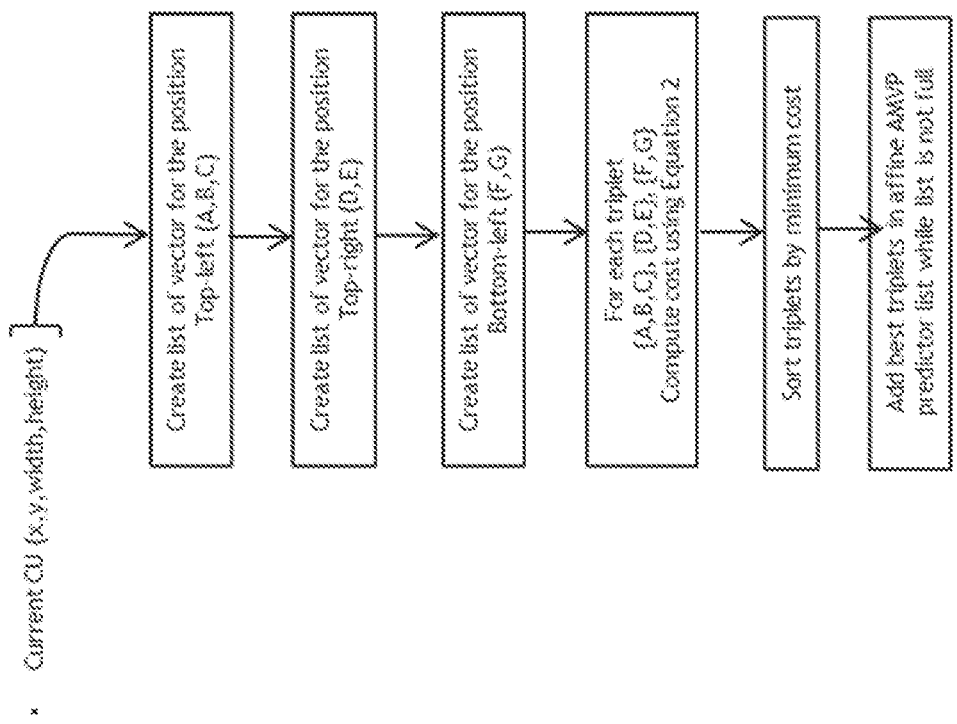
FIG. 6 shows the process for creating new candidates in affine AMVP process.

A CU in AMVP mode, having size larger than 8×8, can be predicted in Affine Inter mode. This is signaled through a flag in the bit-stream. The generation of the Affine Motion Field for that inter CU includes determining control point motion vectors (CPMV), which are obtained by the decoder through the addition of a motion vector difference and a control point motion vector prediction (CPMVP). The CPMVP is a pair of motion vector candidates, respectively taken from the list (A, B, C) and (D, E), as illustrated in FIG. 5.

Up to 6 CPMVP may be obtained (3 for $\vec{v_0}$ multiplied by 2 for $\vec{v_1}$).

First CPMVP are checked for validity using Equation 2, for a block of height H and Width W:

Equation 2: Validity test for each CPMVP $$\overrightarrow{\Delta Hor} = \vec{v1} - \vec{v0}$$

$$DiffH = \frac{W}{2}$$

$$DiffV = \frac{H}{2}$$

validity =

$$\overrightarrow{\Delta Hor} \mathrel{!=} \vec{0}\ \&\&\ \mathrm{abs}(\overrightarrow{\Delta Hor}.X) \le DiffH\ \&\&\ \mathrm{abs}(\overrightarrow{\Delta Hor}.Y) \le DiffV\ \&\&$$
$$\mathrm{abs}(\overrightarrow{\Delta Ver}.X) \le DiffH\ \&\&\ \mathrm{abs}(\overrightarrow{\Delta Ver}.Y) \le DiffV$$

Valid CPMVP are then sorted depending on the value of a third motion vector $\vec{v}_2$, (taken from position F or G). The closest $\vec{v}_2$ is to the vector given by the affine motion model for the 4×4 sub-block at the same position as $\vec{v}_2$, the better is the CPMVP.

For a block of Height H and Width W, the cost of each CPMVP is computed with Equation 3. In the following equation X and Y are respectively the horizontal and vertical components of a motion vector.

Equation 3: Cost computed for each CMVP $$\overrightarrow{\Delta Hor} = \vec{v1} - \vec{v0}$$

$$\overrightarrow{\Delta Ver} = \vec{v2} - \vec{v0}$$

$$\mathrm{cost} = \mathrm{abs}(\overrightarrow{\Delta Hor}.X * H - \overrightarrow{\Delta Ver}.Y * W) + \mathrm{abs}(\overrightarrow{\Delta Hor}.Y * H + \overrightarrow{\Delta Ver}.X * W)$$

Affine Merge

Figure 7:
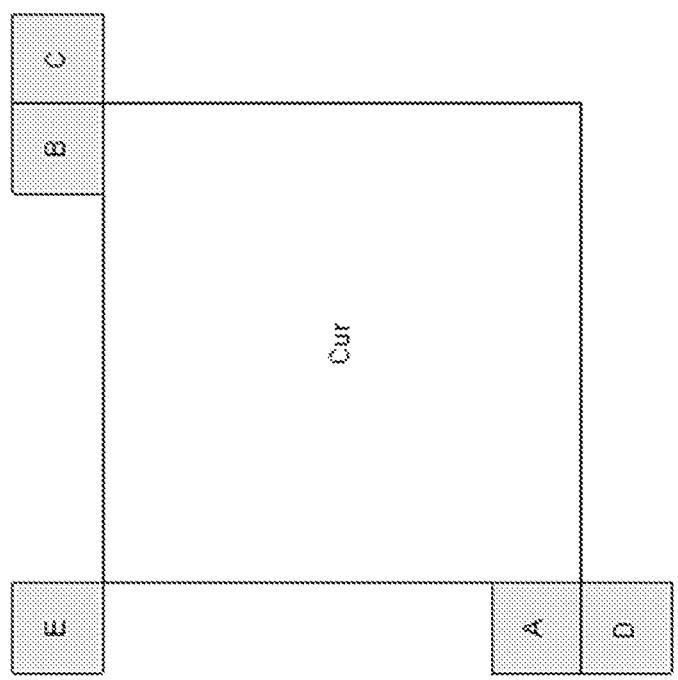
FIG. 7 shows the Motion vector prediction candidates in the Affine Merge mode.

In Affine Merge mode, a CU-level flag indicates if a merge CU employs affine motion compensation. If so, then the first available neighboring CU that has been coded in an Affine mode is selected among the ordered set of candidate positions (A, B, C, D, E) of FIG. 7.

Figure 8:
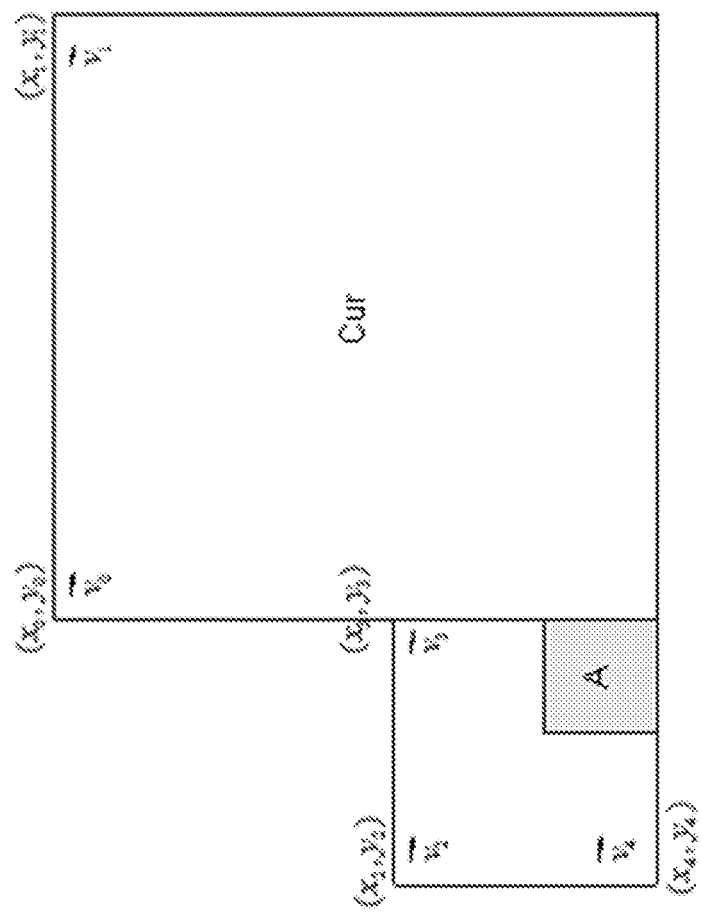
FIG. 8 shows the spatial derivation of affine motion field control points in the case of Affine Merge.

Once the first neighboring CU in Affine mode is obtained, then the 3 motion vectors $\vec{v}_2$, $\vec{v}_3$, and $\vec{v}_4$ from the top-left, top-right and bottom-left corners of the neighboring CU are retrieved (see FIG. 8). Based on these three vectors, the two CPMV of the top-left and top-right corners of current CU are derived as follows:

Equation 4: derivation of current CU's CPMV based on the three corner motion vectors of the neighboring CU $$\circ\ \vec{v_0} = \vec{v_2} + (\vec{v_4} - \vec{v_2})\left(\frac{Y_{curr} - Y_{neighb}}{H_{neighb}}\right) + (\vec{v_3} - \vec{v_2})\left(\frac{X_{curr} - X_{neighb}}{W_{neighb}}\right)$$

$$\circ\ \vec{v_1} = \vec{v_0} + (\vec{v_3} - \vec{v_2})\left(\frac{W_{curr}}{W_{neighb}}\right)$$

When the control point motion vectors $\vec{v}_0$ and $\vec{v}_1$ of a current CU are obtained, the motion field inside the current CU is computed on a 4×4 sub-CU basis, through the model of Equation 1.

In a prior work, more candidates are added for Affine merge mode, selecting the best candidate among a maximum of 7 candidates and coding the index of the best candidate in the bitstream.

Another type of candidate is called temporal affine:

Similar to TMVP (Temporal Motion Vector Predictor) candidates, affine CU are searched in reference images and added to the candidates list.

Figure 9:
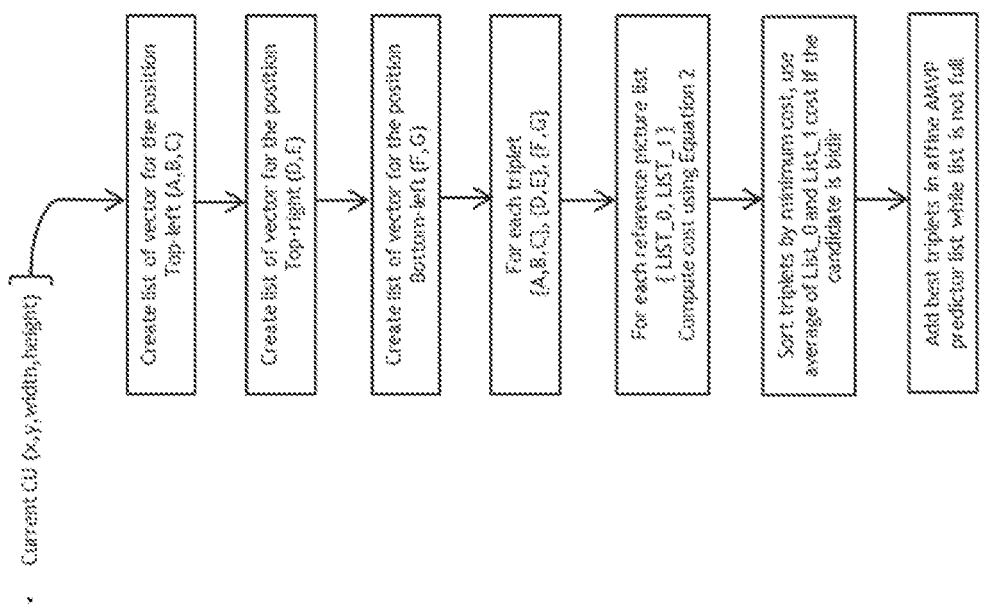
FIG. 9 shows an exemplary process to create new affine candidates.

In another work, a new process to create "virtual" candidates is added (see FIG. 9). The motivation is to create affine candidates when no affine CU are available around the current CU. To do so, an affine model is created by taking the motion of individual sub-blocks at the corner and creating an "affine" model.

Currently, in order to add temporal affine candidates, it is required to store in the temporal motion buffer (associated with each reference picture) the following information:

The CU (or PU) information: size and position

The affine flag: to tell if a particular CU is affine or not

The affine model parameters in case it is not stored directly in the motion vector of the sub-block.

One issue is that the memory needed to store this information is quite large for a hardware decoder.

One problem solved by the general aspects described herein is to enable the creation of virtual temporal affine candidates, avoiding the storage of additional affine parameters in the temporal motion buffer.

In JEM or VTM, there is no affine temporal. In JVET0021, affine temporal requires the storage of additional parameters.

One basic idea of the proposed aspects described is creating new temporal affine candidates using only the classical temporal motion buffer information.

Compared to the previous process of creating a virtual affine candidate from neighboring motion vectors, the virtual temporal affine candidate method can have some differences. As the temporal motion buffer resolution might differ from the current motion buffer, some adaptations can be needed to select the sub-block motion vectors. Again, because of the motion buffer resolution, the sub-block motion vector might be further away from the corner of the current CU defining the affine model, and a motion model adaptation can be needed. After sub-block motion vector selection, a rescaling depending on the reference index of both the current and reference frame (similar to the TMVP process) can be performed. Moreover, an additional step of reference index consistency can be performed.

The described aspects involve normative modification of the codec: syntax and decoding process.

Figure 10:
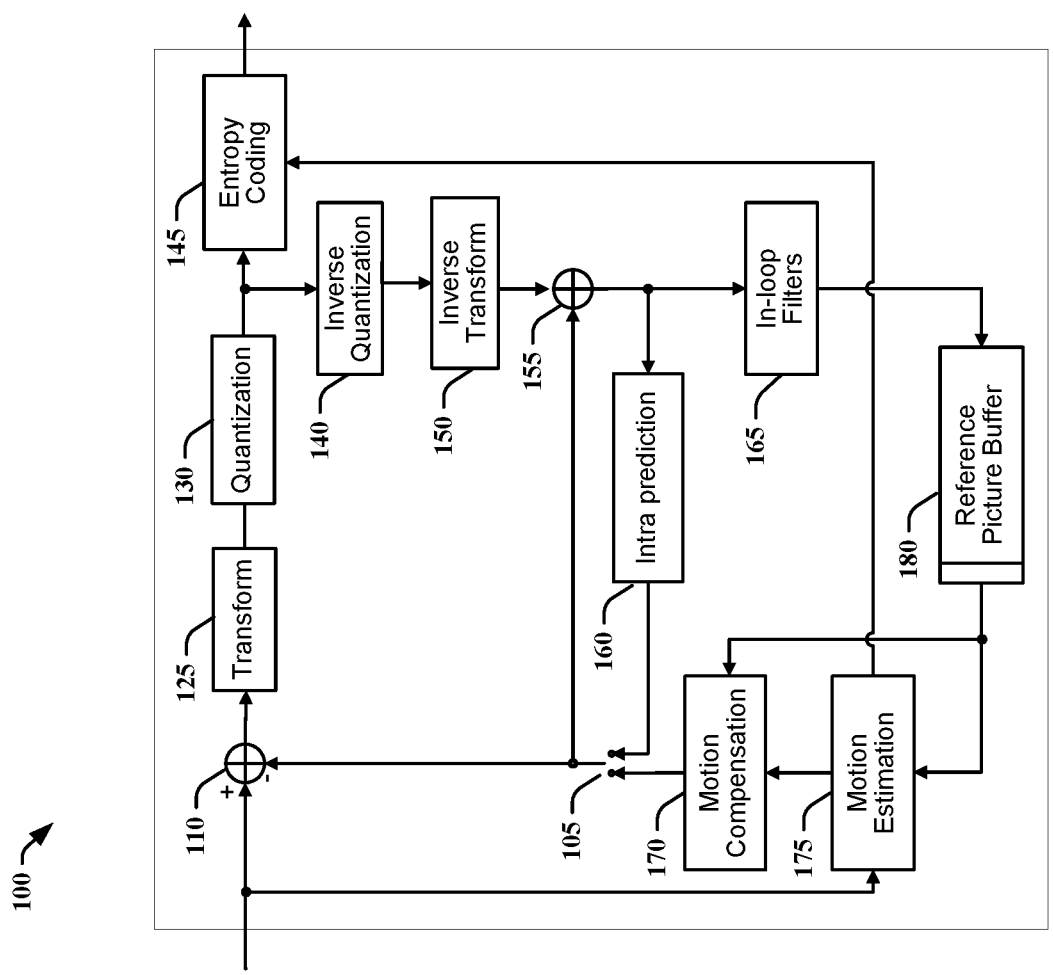
FIG. 10 shows a standard, generic, video compression scheme.
Figure 11:
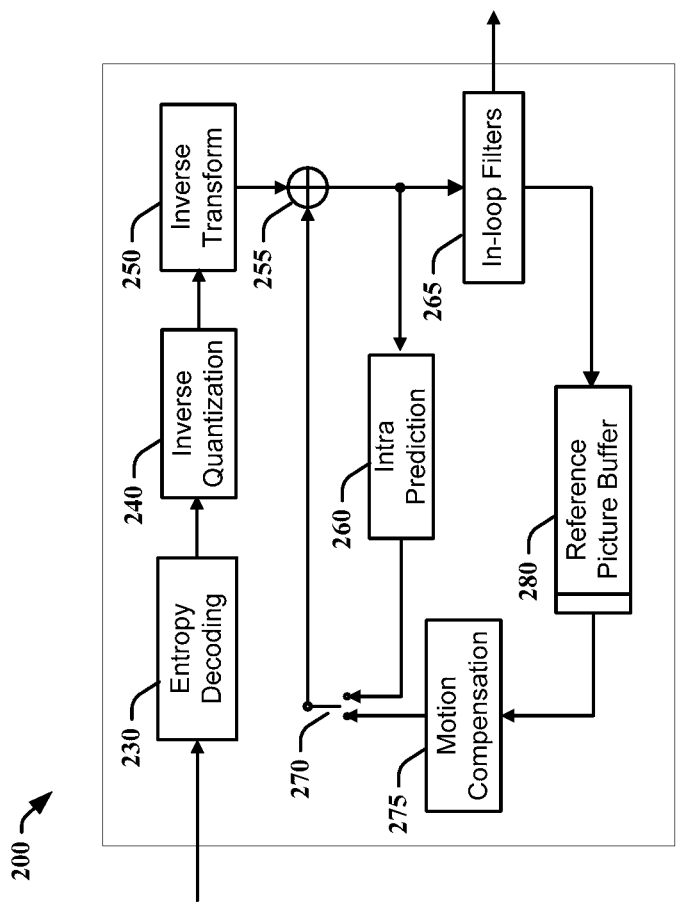
FIG. 11 shows a standard, generic, video decompression scheme.

The impacted codec modules are the motion estimation 175 of FIG. 9 and the motion compensation 170 of FIG. 9 and 275 of FIG. 10.

Figure 12:
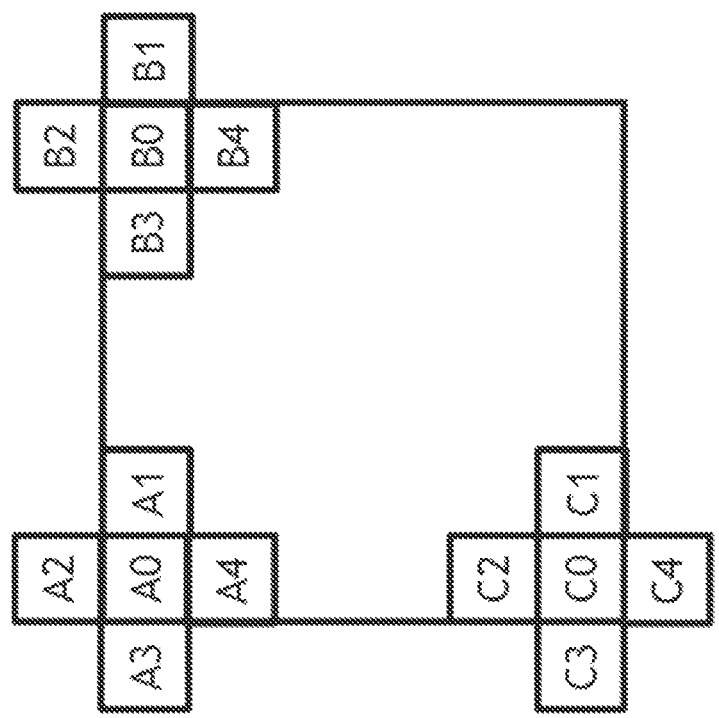
FIG. 12 shows a virtual temporal candidate sub-block.
Figure 13:
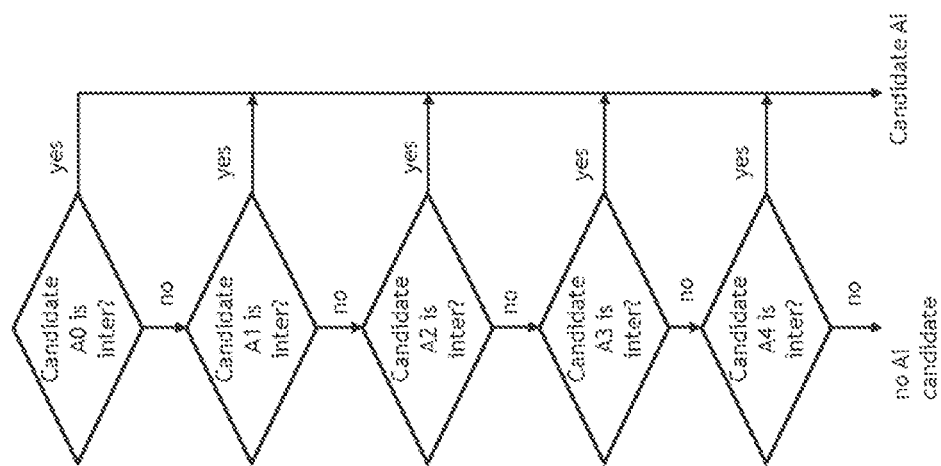
FIG. 13 shows an exemplary process to select a corner sub-block.

FIG. 12 shows the sub-block used to compute the affine model. For each corners A, B and C, the process shown in FIG. 13 is applied: the sub-blocks are examined in order from 0 to 4. Once a valid sub-block is found (i.e. a sub-block with a motion vector), it is used to compute the affine model. Note that contrary to the classical virtual affine, sub-block inside the block can also be selected.

In an alternative embodiment, the order can be different from A0, A1, . . . A4 but is fixed between coder and decoder.

Figure 14:
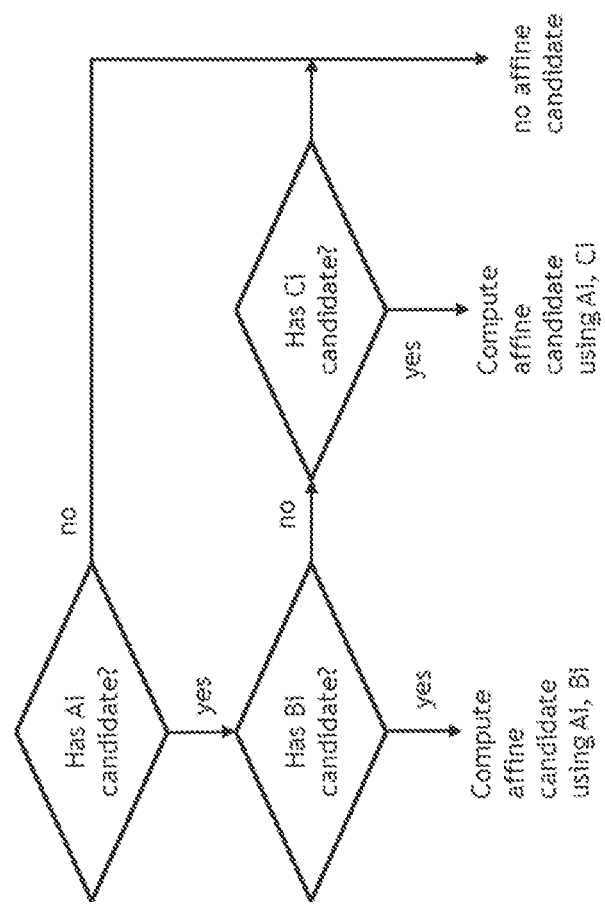
FIG. 14 shows an exemplary affine model computation.

In FIG. 14, we show the process to compute the resulting affine model for a 4-parameter affine model. For a 6-parameter affine model, the 3 corners can be used together. In this embodiment, the A corner is mandatory. In an alternate embodiment, the affine motion model can be computed as long as at least 2 corners are available.

Figure 15:
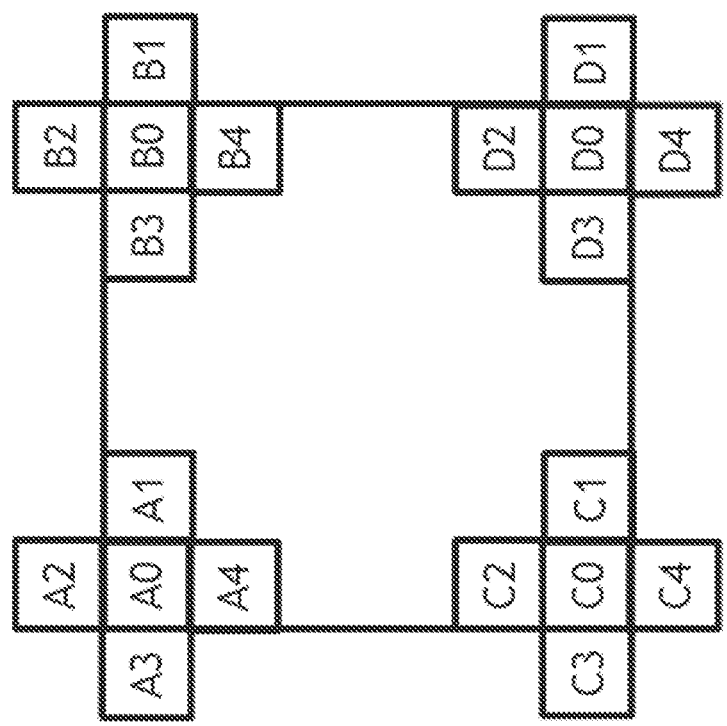
FIG. 15 shows alternative sub-block candidates.

Alternatively, if a corner is missing (i.e. no motion vector), one more corner can be used (such as the D corner in FIG. 15, for example).

In all cases, when a corner is missing, it can be reconstructed if other corners are available using various methods, such as one described in a prior work. If all vectors to compute the affine model are equal, the temporal affine candidate is discarded from the list of candidates.

The candidate collocated sub-block are taken from the reference pictures of the current picture buffer. For each reference list (list 0 and list 1), each reference picture is examined in order as a potential candidate for collocated block. For the given collocated block, its reference picture is taken, and a search is performed in the reference list of the current picture. If the picture is not found, then the first reference picture is taken for the current CU.

Figure 16:
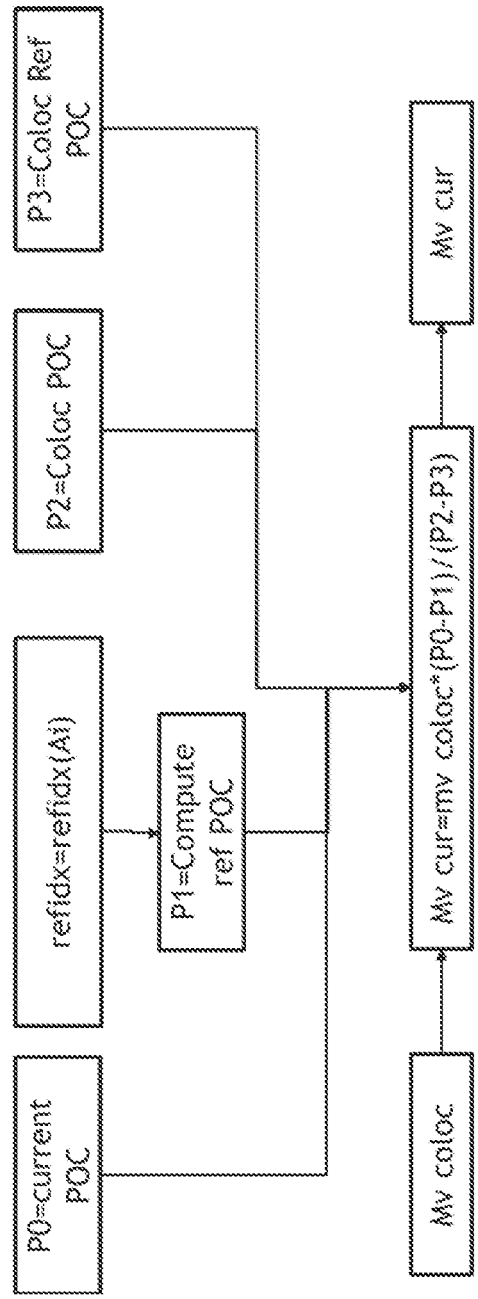
FIG. 16 shows an exemplary rescaling stage for collocated motion vectors.

FIG. 16 shows the rescaling stage for collocated candidates. The main difference with a classical temporal candidate is that the reference POC (Picture Order Count) of the motion field for the current CU is chosen from the Ai candidate, the top-left motion vector candidate of a video block.

Figure 17:
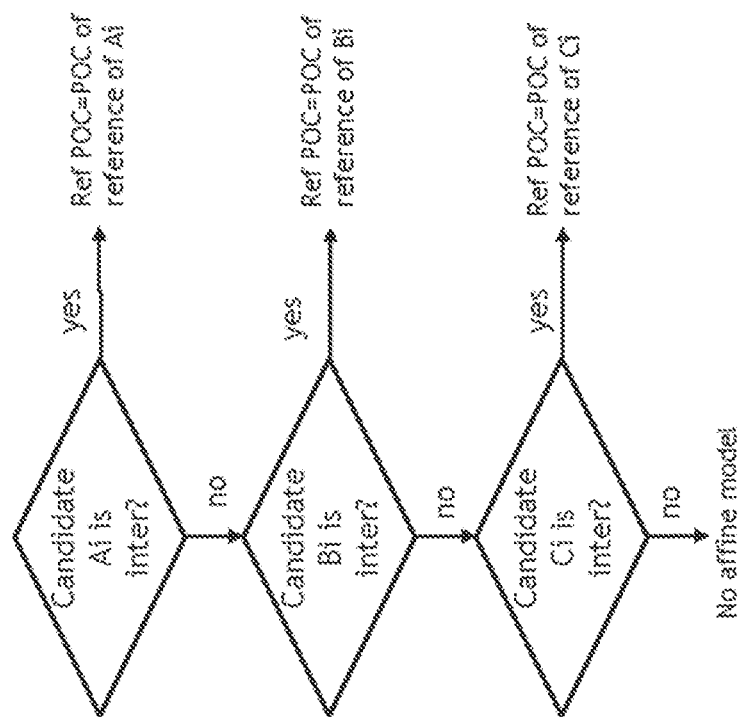
FIG. 17 shows an exemplary flow diagram for reference POC (Picture Order Count) selection.

Alternatively, the reference POC can be chosen as the first available candidate between A, B and C as shown in FIG. 17.

In case the reference POC is not in the list of the reference images of the current reference picture list, the POC of the first image in the reference picture buffer can be chosen.

As the resolution of the motion buffer of a reference picture can be different from the resolution of the motion buffer of the current frame, some adaptation can be needed.

A typical example is to have a current motion buffer with a resolution of 4×4, meaning that a motion vector is available for each 4×4 sub-block. For the reference motion buffer, a typical resolution is 8×8.

Figure 18:
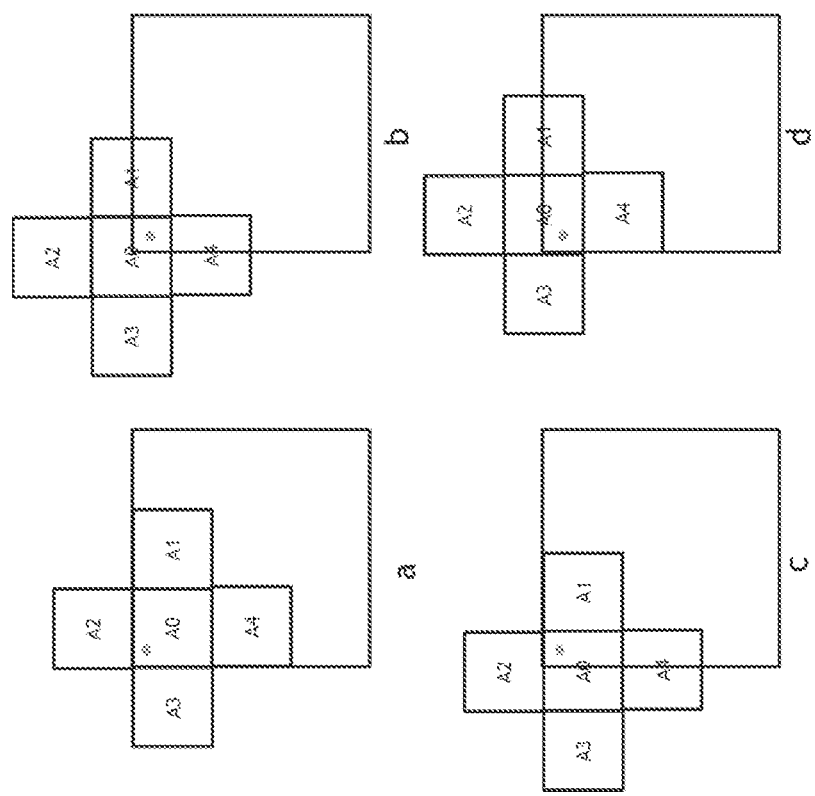
FIG. 18 shows an example of resolution dependent motion vector candidates.

In order to select the 5 possible sub-blocks, depending on the current block position, the candidates are different (see FIG. 18 for an example with Ai).

Compared to a 4×4 motion buffer where we take the vector at these coordinates:

A0: (x,y)
A1: (x+4,y)
A2: (x,y−4)
A3: (x−4,y)
A4: (x,y+4)

The motion vector candidate coordinate is adapted as:
A0: (x,y)
A1: (x+8,y)
A2: (x,y−8)
A3: (x−8,y)
A4: (x,y+8)

In case the current CU size is less than 2×s, where s is the temporal motion buffer resolution (for example 8 here), then the affine candidate is discarded from the list of possible candidates.

Figure 19:
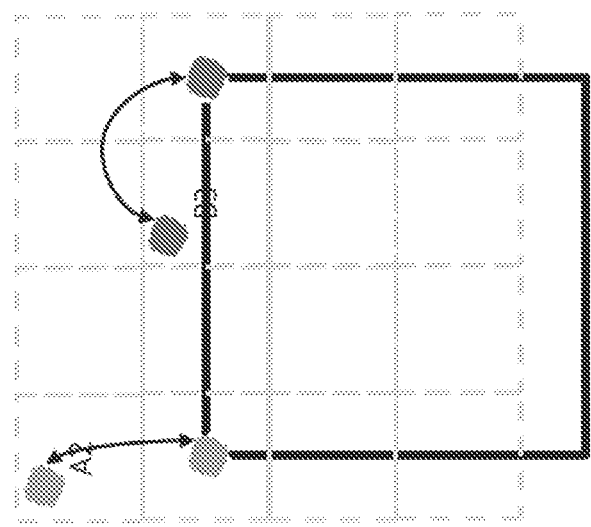
FIG. 19 shows an offset between the candidate and the affine model vectors.

As shown in FIG. 19, the offset between the candidate motion vector and the support vector of the affine model can be quite large, especially when the temporal motion buffer resolution increases. In the figure, we show the case were the temporal motion buffer is built by a simple sub-sampling of the original motion buffer (i.e. always taking the top-left motion vector of the 4×4 sub-block as the motion vector of the 8×8 sub-block).

In order to adapt to this offset, the affine model is computed using the method used for spatial affine model where a model is transferred from one CU to another.

Alternatively, depending on the CU position, the candidate order can be changed. The main idea is to take first the closest candidate. In FIG. 18, the order to select the candidate would be:

Case a: A0, A2, A3, A1, A4 (alternatively A2 and A3 can be swap, as well as A1 and A4)
Case b: A0, A1, A4, A2, A3 (alternatively A1 and A4 can be swap, as well as A2 and A3)
Case c: A0, A1, A2, A3, A4 (alternatively A1 and A2 can be swap, as well as A3 and A4)
Case d: A0, A3, A4, A1, A2 (alternatively A3 and A4 can be swap, as well as A1 and A2)

This document describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 20:
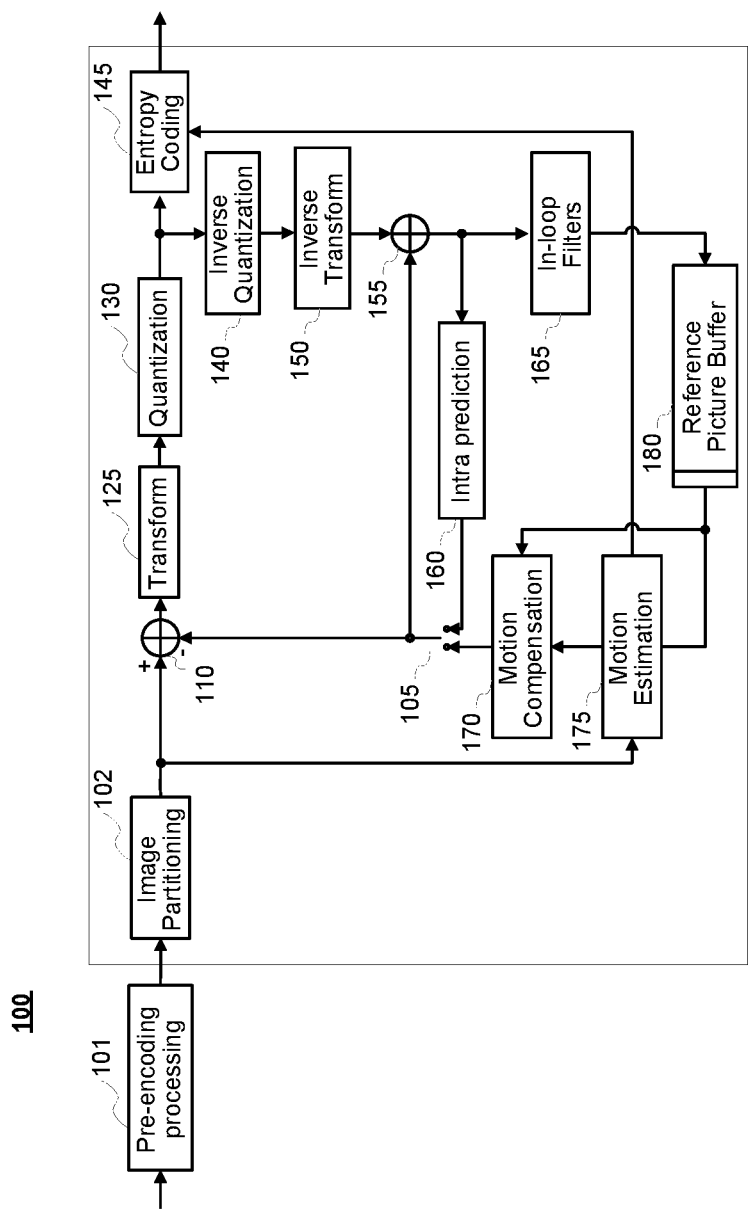
FIG. 20 shows another standard, generic video compressor with pre-encoding processing and image partitioning.
Figure 21:
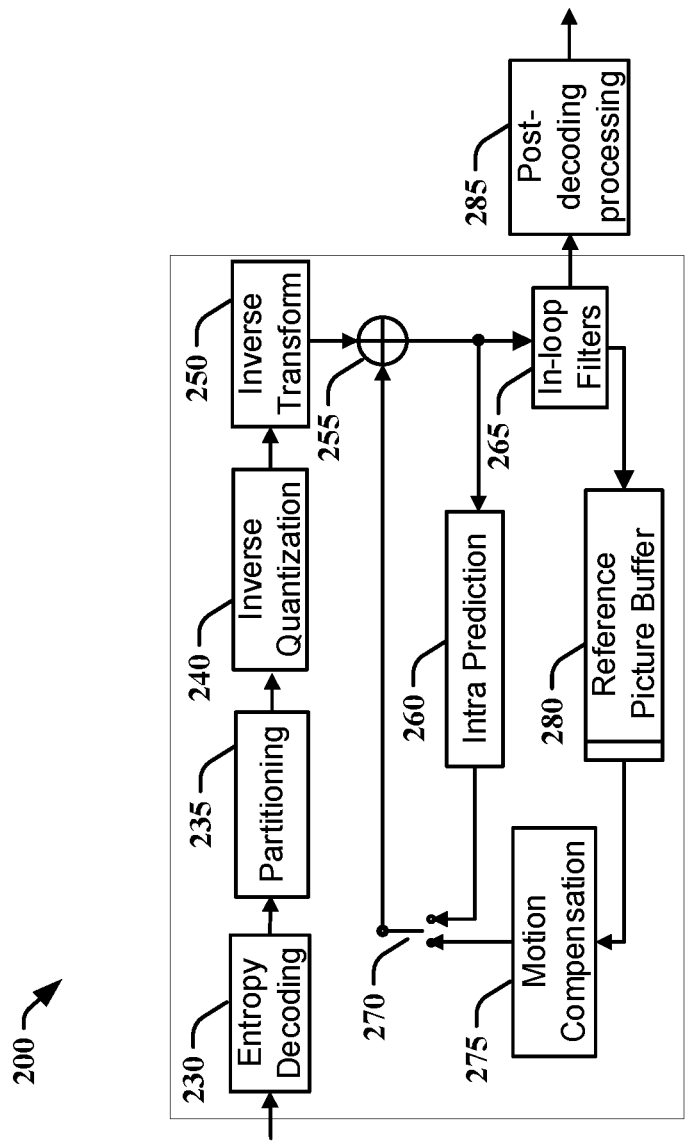
FIG. 21 shows another standard, generic, video decompressor with post-decoding processing.
Figure 22:
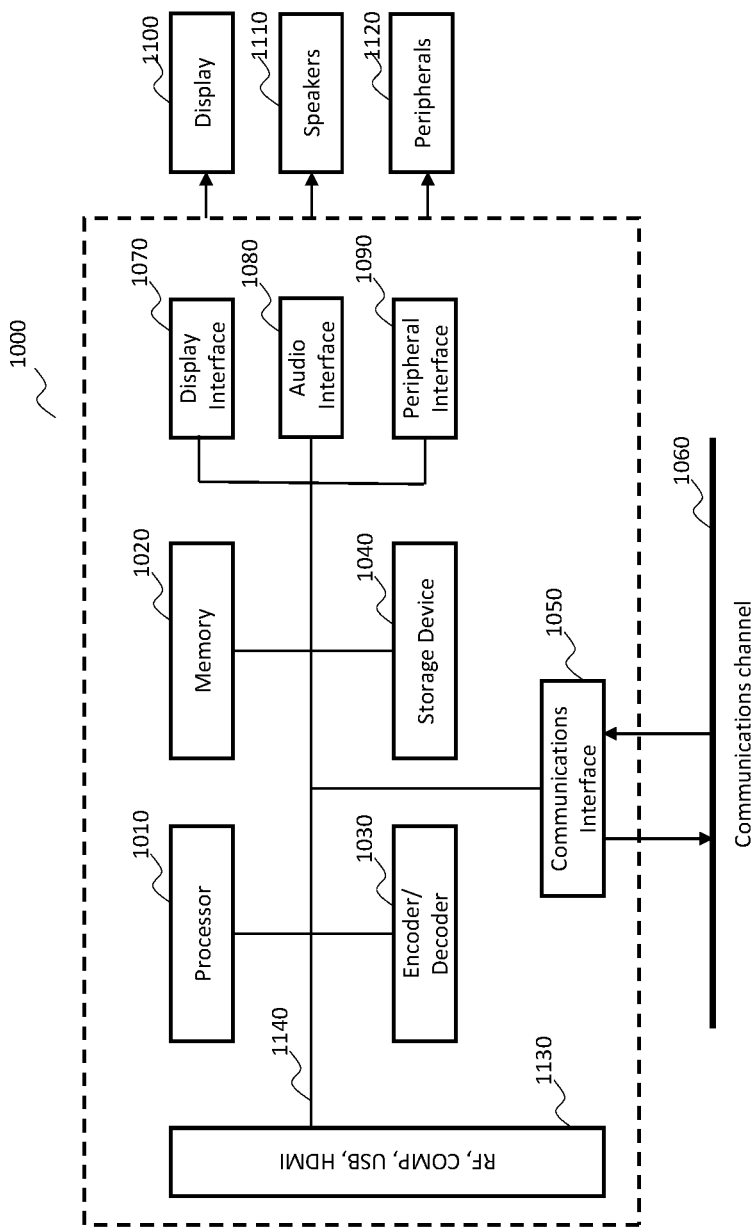
FIG. 22 shows a typical processor arrangement in which the described embodiments may be implemented.

The aspects described and contemplated in this document can be implemented in many different forms. FIGS. 20, 21, and 22 below provide some embodiments, but other embodiments are contemplated and the discussion of FIGS. 20, 21, and 22 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this document can be used to modify modules, for example, the motion estimation, motion compensation, entropy coding, and/or decoding modules (175, 170, 360, 145, 330), of a video encoder 100 and decoder 200 as shown in FIG. 20 and FIG. 21. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this document can be used individually or in combination.

Various numeric values are used in the present document. The specific values are for example purposes and the aspects described are not limited to these specific values.

FIG. 20 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 21 illustrates a block diagram of a video decoder 200. In the decoder 200, a bitstream is decoded by the decoder elements as described below. Video decoder 200 generally performs a decoding pass reciprocal to the encoding pass as described in FIG. 20. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 22 illustrates a block diagram of an example of a system in which various aspects and embodiments are implemented. System 1000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit, multiple ICs, and/or discrete components. For example, in at least one embodiment, the processing and encoder/decoder elements of system 1000 are distributed across multiple ICs and/or discrete components. In various embodiments, the system 1000 is communicatively coupled to other similar systems, or to other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, EEPROM, ROM, PROM, RAM, DRAM, SRAM, flash, magnetic disk drive, and/or optical disk drive. The storage device 1040 can include an internal storage device, an attached storage device, and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In several embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of a television. In at least one embodiment, a fast, external dynamic volatile memory such as a RAM is used as working memory for video coding and decoding operations, such as for MPEG-2, HEVC, or VVC (Versatile Video Coding).

The input to the elements of system 1000 can be provided through various input devices as indicated in block 1130. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 1130 have associated respective input processing elements as known in the art. For example, the RF portion can be associated with elements necessary for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement 1140, for example, an internal bus as known in the art, including the 120 bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed to the system 1000, in various embodiments, using a Wi-Fi network such as IEEE 802.11. The Wi-Fi signal of these embodiments is received over the communications channel 1060 and the communications interface 1050 which are adapted for Wi-Fi communications. The communications channel 1060 of these embodiments is typically connected to an access point or router that provides access to outside networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130.

The system 1000 can provide an output signal to various output devices, including a display 1100, speakers 1110, and other peripheral devices 1120. The other peripheral devices 1120 include, in various examples of embodiments, one or more of a stand-alone DVR, a disk player, a stereo system, a lighting system, and other devices that provide a function based on the output of the system 1000. In various embodiments, control signals are communicated between the system 1000 and the display 1100, speakers 1110, or other peripheral devices 1120 using signaling such as AV.Link, CEC, or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device, for example, a television. In various embodiments, the display interface 1070 includes a display driver, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion optimization. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this document are not necessarily all referring to the same embodiment.

Additionally, this document may refer to "determining" various pieces of information. Determining the information can include one or more of, for example, estimating the information, calculating the information, predicting the information, or retrieving the information from memory.

Further, this document may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this document may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of parameters. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

Embodiments may include one or more of the following features or entities, alone or in any combination across various different claim categories and types:

Modifying the temporal affine candidate selection process applied in the decoder and/or encoder.

Enabling several advanced temporal affine candidate selection methods in the decoder and/or encoder.

Inserting in the signaling syntax elements that enable the decoder to identify the temporal affine candidate to use.

Selecting, based on these syntax elements, the temporal affine candidate selection method to apply at the decoder.

Applying the temporal affine candidate selection method for deriving the temporal affine candidate at the decoder.

Adapting residues at an encoder according to any of the embodiments discussed.

A bitstream or signal that includes one or more of the described syntax elements, or variations thereof.

Inserting in the signaling syntax elements that enable the decoder to adapt residues in a manner corresponding to that used by an encoder.

Creating and/or transmitting and/or receiving and/or decoding a bitstream or signal that includes one or more of the described syntax elements, or variations thereof.

A TV, set-top box, cell phone, tablet, or other electronic device that performs temporal affine candidate selection according to any of the embodiments described.

A TV, set-top box, cell phone, tablet, or other electronic device that performs temporal affine candidate selection according to any of the embodiments described, and that displays (e.g. using a monitor, screen, or other type of display) a resulting image.

A TV, set-top box, cell phone, tablet, or other electronic device that tunes (e.g. using a tuner) a channel to receive a signal including an encoded image, and performs temporal affine candidate selection according to any of the embodiments described.

A TV, set-top box, cell phone, tablet, or other electronic device that receives (e.g. using an antenna) a signal over the air that includes an encoded image, and performs temporal affine candidate selection according to any of the embodiments described.

Various other generalized, as well as particularized, aspects, embodiments and claims are also supported and contemplated throughout this disclosure.

Figure 23:
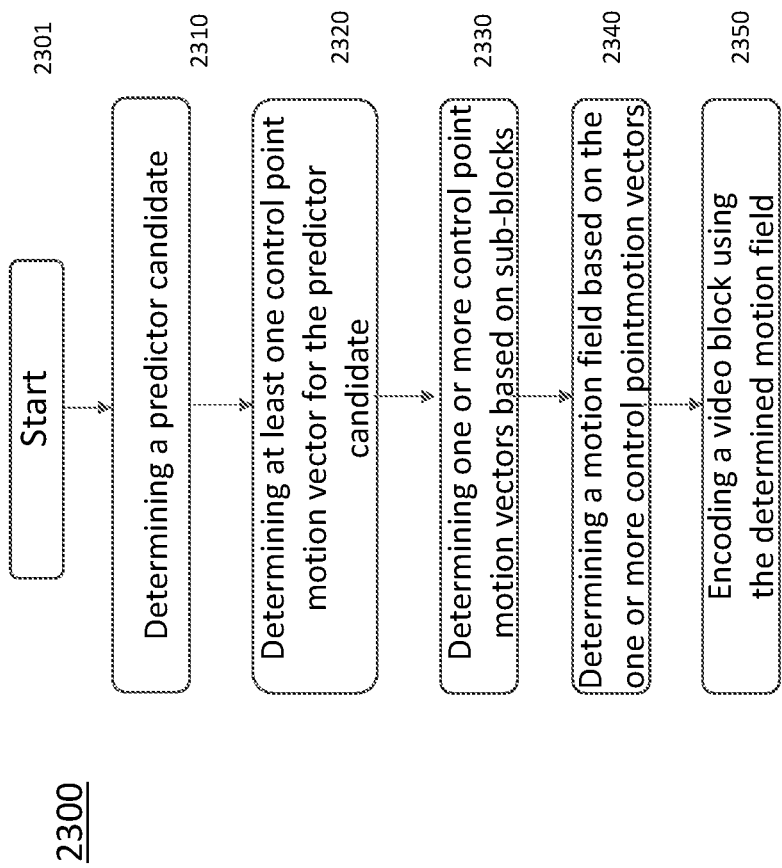
FIG. 23 shows one embodiment of a method for encoding a video block using virtual temporal affine candidates.

One embodiment of a method 2300 for coding a video block using virtual temporal affine candidates is shown in FIG. 23. The method commences at Start block 2301 and control proceeds to block 2310 for determining at least one predictor candidate. Control then proceeds from block 2310 to block 2320 for determining for the at least one predictor candidate, one or more corresponding control point motion vectors, based on motion information associated to the at least one predictor candidate. Control then proceeds from block 2320 to block 2330 for determining for the video block being encoded, one or more corresponding control point motion vectors, based on neighboring sub-blocks surrounding corner sub-blocks of the video block, wherein said neighboring sub-blocks surrounding corner sub-blocks are searched in an order to determine a first neighboring sub-block having a motion vector and using that as a predictor candidate for the corresponding corner. Control then proceeds from block 2330 to block 2340 for determining, based on the one or more corresponding control point motion vectors determined for the video block, a corresponding motion field, wherein the corresponding motion field identifies motion vectors used for prediction of sub-blocks of the video block being encoded. Control proceeds from block 2340 to block 2350 for encoding the video block based on the corresponding motion field.

Figure 24:
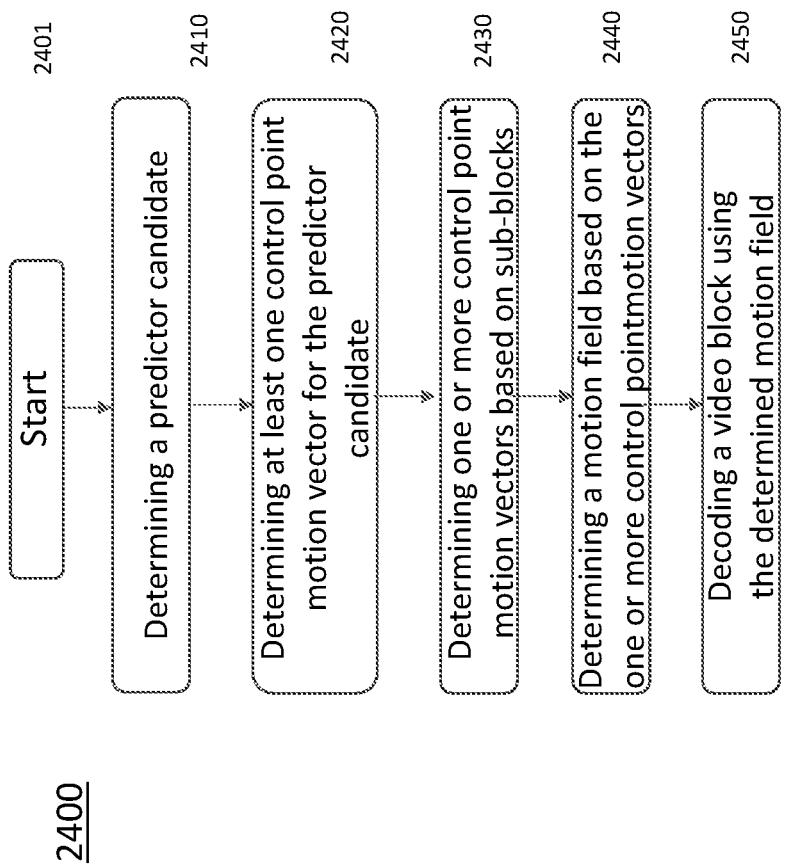
FIG. 24 shows one embodiment of a method for decoding a video block using virtual temporal affine candidates.

One embodiment of a method 2400 for decoding a video block using virtual temporal affine candidates is shown in FIG. 24. The method commences at Start block 2401 and control proceeds to block 2410 for determining at least one predictor candidate. Control then proceeds from block 2410 to block 2420 for determining for the at least one predictor candidate, one or more corresponding control point motion vectors, based on motion information associated to the at least one predictor candidate. Control then proceeds from block 2420 to block 2430 for determining for the video block being decoded, one or more corresponding control point motion vectors, based on neighboring sub-blocks surrounding corner sub-blocks of the video block, wherein said neighboring sub-blocks surrounding corner sub-blocks are searched in an order to determine a first neighboring sub-block having a motion vector and using that as a predictor candidate for the corresponding corner. Control then proceeds from block 2430 to block 2440 for determining, based on the one or more corresponding control point motion vectors determined for the video block, a corresponding motion field, wherein the corresponding motion field identifies motion vectors used for prediction of sub-blocks of the video block being decoded. Control proceeds from block 2440 to block 2450 for decoding the video block based on the corresponding motion field.

FIG. 25 shows one embodiment of an apparatus 2500 for encoding or decoding a video block using virtual temporal affine candidates. The apparatus comprises Processor 2510 having one or more input and output ports and can be interconnected through one or more communication ports to a memory 2520. Apparatus 2500 is capable of performing either of the methods of FIG. 23 or FIG. 24 or any variant.

The invention claimed is:

1. A method, comprising:
determining, for a video block being encoded in a picture, at least one predictor candidate based on an affine motion model in which virtual temporal affine candidates are generated for affine merge mode;
determining for the at least one predictor candidate, one or more corresponding control point motion vectors, based on motion information associated to the at least one predictor candidate;
determining for the video block being encoded, one or more corresponding control point motion vectors, based on neighboring sub-blocks surrounding corner sub-blocks of the video block, wherein said neighboring sub-blocks surrounding corner sub-blocks are searched in an order to determine a first neighboring sub-block having a motion vector and using that as a predictor candidate for the corresponding corner, wherein candidate collocated sub-blocks are taken from reference pictures of a current picture buffer avoiding a need to store additional affine parameters in a temporal motion buffer;
determining, based on the one or more corresponding control point motion vectors determined for the video block, a corresponding motion field, wherein the corresponding motion field identifies motion vectors used for prediction of sub-blocks of the video block being encoded; and,
encoding the video block based on the corresponding motion field, wherein picture order count for said motion field is chosen from the top-left motion vector candidate of the video block.

2. The method of claim 1, wherein said order is the corner sub-block of the video block, followed by sub-blocks right, above, left, and below the corner sub-block.

3. The method of claim 1, wherein corners of the video block to find candidate motion vectors to use in determining control point motion vectors are top-left, and either bottom-left or top-right.

4. A non-transitory computer readable medium containing data content generated according to the method of claim 1, for playback using a processor.

5. An apparatus for encoding a video block, comprising:
a processor, configured to:
determine, for a video block being encoded in a picture, at least one predictor candidate based on an affine motion model in which virtual temporal affine candidates are generated for affine merge mode;
determine for the at least one predictor candidate, one or more corresponding control point motion vectors, based on motion information associated to the at least one predictor candidate;
determine for the video block being encoded, one or more corresponding control point motion vectors, based on neighboring sub-blocks surrounding corner sub-blocks of the video block, wherein said neighboring sub-blocks surrounding corner sub-blocks are searched in an order to determine a first neighboring sub-block having a motion vector and using that as a predictor candidate for the corresponding corner, wherein candidate collocated sub-blocks are taken from reference pictures of a current picture buffer avoiding a need to store additional affine parameters in a temporal motion buffer;
determine, based on the one or more corresponding control point motion vectors determined for the video block, a corresponding motion field, wherein the corresponding motion field identifies motion vectors used for prediction of sub-blocks of the video block being encoded; and,
encode the video block based on the corresponding motion field, wherein picture order count for said motion field is chosen from the top-left motion vector candidate of the video block.

6. The apparatus of claim 5, wherein said order is the corner sub-block of the video block, followed by sub-blocks right, above, left, and below the corner sub-block.

7. The apparatus of claim 5, wherein corners of the video block to find candidate motion vectors to use in determining control point motion vectors are top-left, and either bottom-left or top-right.

8. A method, comprising:
determining, for a video block being decoded in a picture, at least one predictor candidate based on an affine motion model in which virtual temporal affine candidates are generated for affine merge mode;
determining for the at least one predictor candidate, one or more corresponding control point motion vectors, based on motion information associated to the at least one predictor candidate;
determining for the video block being decoded, one or more corresponding control point motion vectors, based on neighboring sub-blocks surrounding corner sub-blocks of the video block, wherein said neighboring sub-blocks surrounding corner sub-blocks are searched in an order to determine a first neighboring sub-block having a motion vector and using that as a predictor candidate for the corresponding corner, wherein candidate collocated sub-blocks are taken from reference pictures of a current picture buffer avoiding a need to store additional affine parameters in a temporal motion buffer;

determining, based on the one or more corresponding control point motion vectors determined for the video block, a corresponding motion field, wherein the corresponding motion field identifies motion vectors used for prediction of sub-blocks of the video block being decoded; and, decoding the video block based on the corresponding motion field, wherein picture order count for said motion field is chosen from the top-left motion vector candidate of the video block.

9. The method of claim 8, wherein said order is the corner sub-block of the video block, followed by sub-blocks right, above, left, and below the corner sub-block.

10. The method of claim 8, wherein corners of the video block to find candidate motion vectors to use in determining control point motion vectors are top-left, and either bottom-left or top-right.

11. The method of claim 8, wherein picture order count for said motion field is chosen from the top-left motion vector candidate, if available, followed by top-right, if available, and the bottom-left of the video block.

12. A non-transitory computer readable medium comprising instructions which, when the program is executed by a computer, cause the computer to carry out the method of claim 8.

13. An apparatus for decoding a video block, comprising: a processor, configured to:

determine, for a video block being decoded in a picture, at least one predictor candidate based on an affine motion model in which virtual temporal affine candidates are generated for affine merge mode;

determine for the at least one predictor candidate, one or more corresponding control point motion vectors, based on motion information associated to the at least one predictor candidate;

determine for the video block being decoded, one or more corresponding control point motion vectors, based on neighboring sub-blocks surrounding corner sub-blocks of the video block, wherein said neighboring sub-blocks surrounding corner sub-blocks are searched in an order to determine a first neighboring sub-block having a motion vector and using that as a predictor candidate for the corresponding corner, wherein candidate collocated sub-blocks are taken from reference pictures of a current picture buffer avoiding a need to store additional affine parameters in a temporal motion buffer;

determine, based on the one or more corresponding control point motion vectors determined for the video block, a corresponding motion field, wherein the corresponding motion field identifies motion vectors used for prediction of sub-blocks of the video block being decoded; and, decode the video block based on the corresponding motion field, wherein picture order count for said motion field is chosen from the top-left motion vector candidate of the video block.

14. The apparatus of claim 13, wherein said order is the corner sub-block of the video block, followed by sub-blocks right, above, left, and below the corner sub-block.

15. The apparatus of claim 13, wherein corners of the video block to find candidate motion vectors to use in determining control point motion vectors are top-left, and either bottom-left or top-right.

16. A device comprising:
an apparatus according to claim 13; and
at least one of (i) an antenna configured to receive a signal, the signal including the video block, (ii) a band limiter configured to limit the received signal to a band of frequencies that includes the video block, and (iii) a display configured to display an output representative of the video block.

17. A method, comprising:

determining, for a video block being decoded in a picture, at least one predictor candidate based on an affine motion model in which virtual temporal affine candidates are generated for affine mere mode;

determining for the at least one predictor candidate, one or more corresponding control point motion vectors, based on motion information associated to the at least one predictor candidate;

determining for the video block being decoded, one or more corresponding control point motion vectors, based on neighboring sub-blocks surrounding corner sub-blocks of the video block, wherein said neighboring sub-blocks surrounding corner sub-blocks are searched in an order to determine a first neighboring sub-block having a motion vector and using that as a predictor candidate for the corresponding corner, wherein candidate collocated sub-blocks are taken from reference pictures of a current picture buffer avoiding a need to store additional affine parameters in a temporal motion buffer;

determining, based on the one or more corresponding control point motion vectors determined for the video block, a corresponding motion field, wherein the corresponding motion field identifies motion vectors used for prediction of sub-blocks of the video block being decoded; and, decoding the video block based on the corresponding motion field, wherein picture order count of a first image in a reference picture buffer is used if a reference picture order count is not among the reference images in a current reference picture list.

18. An apparatus for decoding a video block, comprising: a processor, configured to perform:

determining, for a video block being decoded in a picture, at least one predictor candidate based on an affine motion model in which virtual temporal affine candidates are generated for affine merge mode;

determining for the at least one predictor candidate, one or more corresponding control point motion vectors, based on motion information associated to the at least one predictor candidate;

determining for the video block being decoded, one or more corresponding control point motion vectors, based on neighboring sub-blocks surrounding corner sub-blocks of the video block, wherein said neighboring sub-blocks surrounding corner sub-blocks are searched in an order to determine a first neighboring sub-block having a motion vector and using that as a predictor candidate for the corresponding corner, wherein candidate collocated sub-blocks are taken from reference pictures of a current picture buffer avoiding a need to store additional affine parameters in a temporal motion buffer;

determining, based on the one or more corresponding control point motion vectors determined for the video block, a corresponding motion field, wherein the corresponding motion field identifies motion vectors used for prediction of sub-blocks of the video block being decoded; and, determining the video block based on the corresponding motion field, wherein picture order count of a first image in a reference picture buffer is used if a reference picture order count is not among the reference images in a current reference picture list.

19. A method, comprising:

determining, for a video block being decoded in a picture, at least one predictor candidate based on an affine motion model in which virtual temporal affine candidates are generated for affine merge mode;

determining for the at least one predictor candidate, one or more corresponding control point motion vectors, based on motion information associated to the at least one predictor candidate;

determining for the video block being decoded, one or more corresponding control point motion vectors, based on neighboring sub-blocks surrounding corner sub-blocks of the video block, wherein said neighboring sub-blocks surrounding corner sub-blocks are searched in an order to determine a first neighboring sub-block having a motion vector and using that as a predictor candidate for the corresponding corner, wherein candidate collocated sub-blocks are taken from reference pictures of a current picture buffer avoiding a need to store additional affine parameters in a temporal motion buffer;

determining, based on the one or more corresponding control point motion vectors determined for the video block, a corresponding motion field, wherein the corresponding motion field identifies motion vectors used for prediction of sub-blocks of the video block being decoded; and, decoding the video block based on the corresponding motion field, wherein resolution adaptation is performed on a current motion buffer to correspond to a reference picture buffer by shifting sub-block locations for a candidate motion vector.

20. An apparatus for decoding a video block, comprising:

a processor, configured to perform:

determining, for a video block being decoded in a picture, at least one predictor candidate based on an affine motion model in which virtual temporal affine candidates are generated for affine merge mode;

determining for the at least one predictor candidate, one or more corresponding control point motion vectors, based on motion information associated to the at least one predictor candidate;

determining for the video block being decoded, one or more corresponding control point motion vectors, based on neighboring sub-blocks surrounding corner sub-blocks of the video block, wherein said neighboring sub-blocks surrounding corner sub-blocks are searched in an order to determine a first neighboring sub-block having a motion vector and using that as a predictor candidate for the corresponding corner, wherein candidate collocated sub-blocks are taken from reference pictures of a current picture buffer avoiding a need to store additional affine parameters in a temporal motion buffer;

determining, based on the one or more corresponding control point motion vectors determined for the video block, a corresponding motion field, wherein the corresponding motion field identifies motion vectors used for prediction of sub-blocks of the video block being decoded; and, decoding the video block based on the corresponding motion field, wherein resolution adaptation is performed on a current motion buffer to correspond to a reference picture buffer by shifting sub-block locations for a candidate motion vector.

\* \* \* \* \*